(12) United States Patent
Sagduyu et al.

(10) Patent No.: US 11,705,943 B1
(45) Date of Patent: Jul. 18, 2023

(54) DISTRIBUTED NETWORK CONTROL AND LINK ACTIVATION FOR MULTI-USER MIMO COMMUNICATION

(71) Applicant: INTELLIGENT AUTOMATION, LLC, Rockville, MD (US)

(72) Inventors: Yalin Evren Sagduyu, Gaithersburg, MD (US); Tugba Erpek, McLean, VA (US); Yi Shi, Boyds, MD (US); Satya Ponnaluri, Gaithersburg, MD (US)

(73) Assignee: INTELLIGENT AUTOMATION, LLC, Rockville, MD (US)

( * ) Notice: Subject to any disclaimer, the term of this patent is extended or adjusted under 35 U.S.C. 154(b) by 332 days.

(21) Appl. No.: 17/007,970

(22) Filed: Aug. 31, 2020

Related U.S. Application Data (60) Provisional application No. 62/893,841, filed on Aug. 30, 2019.

(51) Int. Cl.
*H04B 7/0452* (2017.01)
*H04L 41/0896* (2022.01)
(Continued)

(52) U.S. Cl.
CPC ....... *H04B 7/0452* (2013.01); *H04L 25/0202* (2013.01); *H04L 41/0896* (2013.01); *H04W 84/18* (2013.01)

(58) Field of Classification Search
None
See application file for complete search history.

(56) References Cited

U.S. PATENT DOCUMENTS

| 2008/0291843 A1* | 11/2008 | Sonnenberg | H04W 40/26 370/254 |
| 2010/0124930 A1* | 5/2010 | Andrews | H04W 36/04 455/447 |

(Continued)

*Primary Examiner* — Mariela Vidal Carpio
(74) *Attorney, Agent, or Firm* — Amster, Rothstein & Ebenstein LLP (57) ABSTRACT

A network control and rate optimization solution for multiuser multiple input multiple output (MU-MIMO) communications in wireless networks. This solution is decentralized and includes scheduling and routing of the MU-MIMO communication links that adapt to dynamic channel, interference, and traffic conditions. The ergodic sum rates of MIMO multiple access channel (MAC) and interference channel (IC) configurations are analyzed by considering the error, and overhead effects due to channel estimation (training) and quantization (feedback). By taking practical considerations such as channel estimation, quantization error and in-network interference into account, the rate gain is shown with an increasing number of antennas compared with single-input single-output (SISO) systems. A distributed channel access protocol to select and activate MU-MIMO configurations is presented with the maximum achievable sum rates using local information on channel, interference, and traffic conditions. The scheduling algorithm is extended to routing via a cross-layer solution based on a decentralized version of the backpressure algorithm. After accounting for the control message overhead, it is shown that the proposed MU-MIMO scheduling and routing solution improves the stable throughput over the minimum distance routing based on frequency of encounters and single user MIMO communications in a mobile ad hoc network (MANET) setting.

20 Claims, 3 Drawing Sheets

(51) Int. Cl.
*H04L 25/02* (2006.01)
*H04W 84/18* (2009.01)

(56) References Cited

U.S. PATENT DOCUMENTS

| | | | |
|---|---|---|---|
| 2012/0002743 A1* | 1/2012 | Cavalcante | H04B 7/024 |
| | | | 375/267 |
| 2016/0352400 A1* | 12/2016 | Chae | H04B 7/06 |
| 2020/0204226 A1* | 6/2020 | Gao | H04B 17/3912 |
| 2020/0351335 A1* | 11/2020 | Shattil | H04L 67/1021 |
| 2020/0366341 A1* | 11/2020 | Lin | H04W 92/12 |
| 2022/0086794 A1* | 3/2022 | Lee | G01S 1/0428 |
| 2022/0295559 A1* | 9/2022 | Cipriano | H04L 47/15 |

* cited by examiner

DISTRIBUTED NETWORK CONTROL AND LINK ACTIVATION FOR MULTI-USER MIMO COMMUNICATION

This non-provisional application claims priority from U.S. provisional patent application Ser. No. 62/893,841 filed on Aug. 30, 2019, the complete disclosure of which is incorporated herein by reference.

This invention was made with government support under Contract Nos. W56KGU-17-C-0014 awarded by the U.S. Army. The government has certain rights in the invention.

BACKGROUND OF THE INVENTION

The subject invention relates to software means to control and activate multi user (MU) multiple-input multiple-output (MIMO) communications at link and network levels. MIMO communications provide major improvements in achievable data rates (by accounting for channel and feedback effects) compared to single antenna communications. To serve multiple concurrent users, MU-MIMO covers more advanced link configurations such as multiple access channel (MAC) configuration used in uplink cellular and local area network (LAN) systems that rely on single-hop and centralized architectures (coordinated by base station or access point).

Multiple input multiple output (MIMO) communication systems vastly improve the data rates compared to single antenna systems. This rate gain increases when the channel state information (CSI) is available at the transmitter. MIMO systems have been mostly adapted in centralized architectures such as cellular communications where the channel access is controlled by a base station. Single user MIMO (SU-MIMO) systems have also been supported in mobile ad hoc networks (MANETs). For instance, beamforming was studied in and interference cancellation (assuming perfect channel estimation) was studied in as medium access control for point-to-point MIMO (i.e., SU-MIMO) links. SU-MIMO communications in MANETs were also considered with centralized degree-of-freedom scheduling and with distributed link scheduling un-der a signal-to-interference-plus-noise ratio (SINR) based interference model.

Multi-user MIMO (MU-MIMO) allows coordinated simultaneous operation of multiple links (either with a common receiver or individual receivers) to use spectrum more efficiently and maximize the throughput. MU-MIMO is distinct from SU-MIMO that corresponds to point-to-point communications between two nodes (a transmitter and a receiver), whereas MU-MIMO covers more advanced channel configurations such as multiple access channel (MAC) and interference channel (IC) configurations. While time-sharing of an SU-MIMO link among multiple users can support the medium access control functionality, MU-MIMO provides better achievable rates for all involved by coordination and coding across different links. A wireless network can be considered as a collection of different SU-MIMO and MU-MIMO configurations. The MAC configuration coordinates multiple transmitters simultaneously transmitting to the same receiver. In an IC configuration, multiple transmitters communicate with their intended receivers simultaneously causing interference to each other. To support simultaneous operation of multiple users, MU-MIMO communications rely on channel estimation and feedback mechanisms. MU-MIMO includes local area networks (LANs) with access points (AP) in, and was integrated into commercial systems such Long-Term Evolution (LTE) where a centralized MU-MIMO scheme is coordinated by AP or base station. The ad-hoc mode is supported. In this mode, devices are organized in groups with one member of the group selected as the Group Owner (GO) that assumes the AP functionality.

The extension of MU-MIMO to wireless networks with full consideration of training, feedback, and decentralized operation is missing due to various challenges including (i) complexity of network topology, channel, and traffic dynamics, (ii) need for handling different MU-MIMO configurations such as multiple access channel (MAC) and interference channel (IC), (iii) need for joint consideration of channel estimation and feedback in rate optimization, and (iv) lack of centralized control. As a result, the MIMO rate analysis has typically focused on a single MIMO configuration and considered either training or feedback optimization.

Despite these developments, the extension of MU-MIMO to distributed and multi-hop wireless networks has been missing. A wireless network can be considered as a collection of different SU-MIMO and MU-MIMO configurations. The MAC configuration coordinates multiple transmitters simultaneously transmitting to the same receiver. In an interference channel (IC) configuration, multiple transmitters communicate with their intended receivers simultaneously causing interference to each other.

The subject invention provides software means to enable MU-MIMO in distributed and multi-hop wireless networks by accounting for network topology, channel and traffic dynamics. The invention handles different MU-MIMO configurations such as MAC and IC, and jointly considers channel estimation and feedback in rate optimization without relying on centralized control.

SUMMARY OF THE INVENTION

In one embodiment of the invention, software means is provided to optimize MU-MIMO rates in a wireless network with distributed and decentralized control that adapts to dynamic channel, interference, and traffic conditions. A distributed channel access protocol collects local information without any centralized scheduler, and selects and activates MU-MIMO configurations with the maximum achievable sum rates depending on channel, interference, and traffic conditions. Network nodes (or users) switch between sensing and transmission. All nodes are potential receivers. A node with data to transmit is also a potential transmitter. A rate-optimizing scheme is integrated to activate the best set of MU-MIMO configurations. Each node starts operating in a random time slot with the sensing state. A transmitter initially senses channel and sends ready-to-send (RTS) if no other ongoing data transmission or clear-to-send (CTS) message is detected. A receiver may receive multiple RTS messages during the sensing period and then it activates the MU-MIMO configuration that can achieve the maximum rate among all potential configurations. After completing this selection, a receiver sends CTS message to activate the selected link(s). Once transmitter node(s) receive the CTS message, the training (sending pilot signals for channel estimation), feedback (channel estimation sent from the receiver to the transmitter) and data transmission phases for MU-MIMO operation are completed within the channel coherence time.

This link activation scheme is integrated within a cross-layer solution based on backpressure algorithm to provide joint network control and link activation for MU-MIMO communications in distributed and multi-hop wireless networks. MU-MIMO communication decisions are made over different time periods depending on how many transmitters are backlogged, which MU-MIMO configuration is activated and how many of transmitters participate in this configuration. State-dependent step-sizes are needed in queue stabilization to accommodate for different queue occupancies to start different MU-MIMO configurations as well as variable lengths of MU-MIMO communication frames that include RTS/CTS packet lengths and timers, time for negotiations, channel estimation, feedback, and actual data trans-mission. To support these operation modes, the subject invention uses a decentralized version of backpressure algorithm by accounting for state-dependent step-sizes necessitated by MU-MIMO communications to stabilize queues and optimize stable rates achieved in a distributed and multi-hop wireless network.

The ergodic sum rate of both MAC (with SU as a special case) and IC configurations is optimized by jointly integrating overhead (due to time allocated for training and feedback), error (due to channel estimation and feedback quantization), and external interference (due to simultaneously activated transmitters) effects. Multiple transmitters transmit to the same receiver in a MAC configuration, whereas multiple transmitter and receiver pairs are activated simultaneously in an IC configuration. The network is decomposed to MAC (with SU as a special case) and IC configurations.

A decentralized channel access protocol was designed that enables MU-MIMO PHY layer benefits in a MANET by selecting and activating MU-MIMO configurations to maximize the achievable sum rate. The system addresses the scheduling problem for single-hop links and the design was extended to joint scheduling and routing (over a multi-hop network) through the application of backpressure algorithm. The centrally scheduled version of backpressure algorithm is optimal in terms of maximizing the stable throughput. A decentralized version of backpressure algorithm is applied and state-dependent step-sizes are considered since decisions are made over different time periods depending on how many transmitters are backlogged, which MU-MIMO configuration is activated and how many of transmitters participate in this configuration. The corresponding throughput-optimal backpressure algorithm was derived that stabilizes packet queues.

MU-MIMO provides major performance gains compared to single antenna systems and SU-MIMO systems in single-hop communications as well as in a MANET environment with multi-hop communications, where minimum distance routing is used as a benchmark and frequency of encounters is used to define the distances to the destinations

BRIEF DESCRIPTION OF THE DRAWINGS

The above-mentioned and other features and objects of this invention and the manner of obtaining them will become more apparent, and the invention itself will be better understood by reference to the following description of embodiments of the present invention taken in conjunction with the accompanying figures, wherein.

Corresponding reference characters indicate corresponding parts throughout the several views. Although the figures represent embodiments of the present invention, the figures are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purpose of promoting an understanding of the principles of the invention, reference will now be made to the embodiments illustrated in the drawing, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

The invention relates to a MAC configuration with N transmitters, each with $n_T$ antennas, transmitting to one receiver with $n_R$ antennas (N=1 refers to the SU case). Channels are dynamic and unknown, and need to be estimated at the receiver (for receiver decoding) and sent back to the transmitter (for precoding and power allocation). The channel is assumed to remain static during a coherence time T that is divided into three phases (training, feedback, and data transmission), as shown in FIG. 1.

Figure 1:
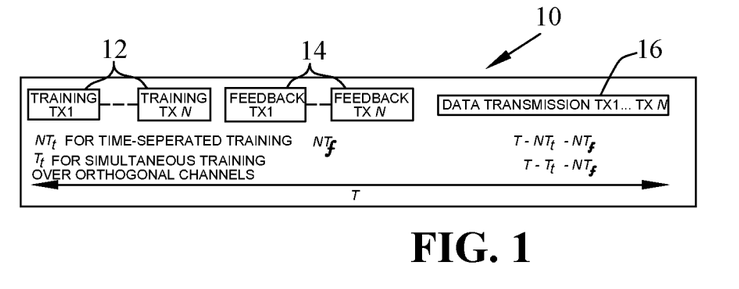
FIG. 1 depicts transmission phases in MIMO.

As shown in FIG. 1, a multiuser network communication system 10 includes a training phase 12, a feedback phase 14, and a data transmission phase 16. In training phase 12, either each transmitter transmits its training sequence separately to the receiver with power $P_t$ over time $T_t$ such that the total training time is $NT_t$, or transmitters transmit their training sequences simultaneously using orthogonal channels such that the total training time is reduced to Tt. For complex Gaussian channels, the estimation noise variance is $\rho_t \alpha^2 \text{tr}(Q)$, where Q is the input covariance matrix, tr(Q) is the trace of Q, $\alpha^2$ is the channel gain, and $\rho_t$ is the channel estimation error, e.g., $$\rho_t = \frac{\sigma^2}{\left(\sigma^2 + \frac{T_t/T_s}{n_T}\alpha^2 P_t\right)}$$

for the minimum mean-squared error (MMSE) estimator, where $T_s$ is the symbol duration and $\alpha^2$ is the noise power.

In the feedback phase 14, the receiver estimates channels and sends feedback separately to each transmitter with power $P_f$. The distortion for each estimated channel entry is Gaussian with variance $\rho_f \alpha^2 tr(Q)$, where $\rho_f=(1-\rho_t)2^{-B}$ and B is the number of bits to quantize one channel entry (according to Rate Distortion Theory). The total feedback time is $NT_f$, where $T_f$ is the feedback time allocated for one channel matrix.

In the data transmission phase 16, each transmitter precodes and allocates power based on the channel estimates received from the receiver and transmits with power $tr(Q)=P_d$ over the remaining time $T_d=T-T_t-NT_f$.

Without assuming packet loss on feedback channel, the effective noise including training and feedback quantization errors is Gaussian with variance $\sigma^2+\rho\alpha^2 tr(Q)$, where $\rho=\rho_t+\rho_f$. The sum rate of MIMO MAC was derived by considering channel estimation only. Channel estimation and feedback, and optimize the ergodic sum rate for N transmitters (in bits/s/Hz) is:

$$C_{MAC} = \max_{T_t,P_t,B} \frac{T_d}{T} E_{\hat{H}_1,\hat{H}_2,\ldots,\hat{H}_N}[\Omega_{MAC}], \quad (1)$$

$$\Omega_{MAC} = \max_{Q_1,Q_2,\ldots,Q_N} \log_2\left(\det\left(I + \frac{\sum_{i=1}^N \hat{H}_i Q_i \hat{H}_i^*}{\sigma^2 + \sum_{i=1}^N \rho_i \alpha_i^2 tr(Q_i)}\right)\right)$$

subject to $$T = T_t + NT_f + T_d, T_f = n_T n_R B T_s, \quad (2)$$

$$\rho_t(i) = \frac{\sigma^2}{\sigma^2 + \frac{T_t/T_s}{n_T}\alpha_i^2 P_t}, \rho_f(i) = (1-\rho_t(i))2^{-B},$$

$$\rho_i = \rho_f(i) + \rho_t(i), P_t T_t + tr(Q_i)T_d \le PT,$$

$$P_f T_f \le PT, P \le P_{max}, P_t \le P_{max}, P_f \le P_{max},$$

where $E_{\hat{H}}$ is the expectation over $\hat{H}$, $\det(\cdot)$ is the determinant of a matrix, I is the identity matrix, and $\hat{H}^*$ is the Hermitian of $\hat{H}$. Channel matrix is $H=\alpha\bar{H}$, where is a complex Gaussian matrix with unit variance and $\alpha^2 \in [0, 1]$ is the channel gain. $\hat{H}_i$ is the estimation of channel matrix $\hat{H}_i$ (from transmitter i to the receiver) with effective channel gain $\alpha_i^2(1-\rho_i)$, $\rho_i=\rho_t(i)+\rho_f(i)$, where $\rho_t(i)$ is the channel estimation error, $\rho_f(i)$ is the feedback quantization error for $\hat{H}_i$, and $Q_i$ is the covariance matrix of transmitter i. The optimization in (1) is non-convex and solved as the outer-inner layer problems. The inner problems fixes $P_t$, $T_t$, B, and solves for Q by waterfilling. The outer problem solves for $P_t$, $T_t$, and B to maximize the ergodic rate.

Figure 2:
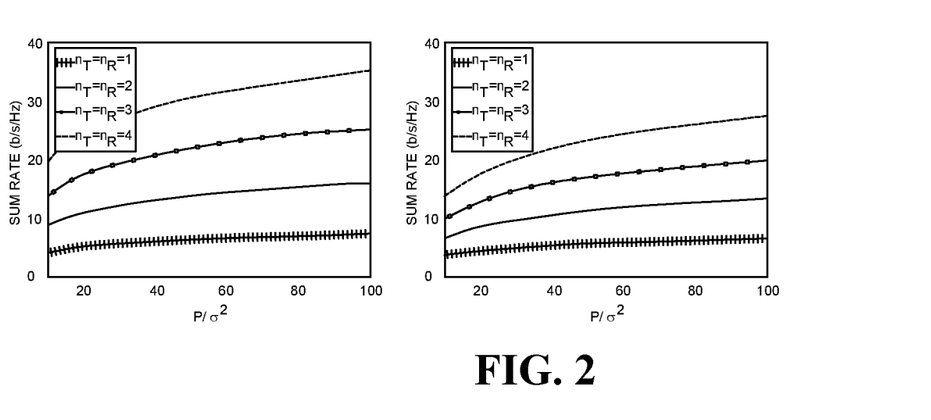
FIG. 2 depicts graphs of the ergodic sum rate of two-user MIMO MAC with full CSI at the transmitter and with channel uncertainty.

For different values of $\eta_T$ and $\eta_R$, the ergodic sum rate of two-user MIMO MAC is shown in FIG. 2 as a function of $P/\sigma^2$ under two cases: (a) perfect CSI and (b) channel uncertainty (i.e., CSI is not available at the transmitter but it is estimated at the receiver and sent back to the transmitter). Channel gains are $$\alpha_1^2 = 1, \alpha_2^2 = 0.5,$$

and coherence time is T=10,000 symbol durations. A Rayleigh fading channel is assumed for both full CSI and channel uncertainty cases. The instantaneous channel values, $\hat{H}_i$, are randomly selected from the same distribution. Results in FIG. 2(a) assume that there is no error associated with channel estimation or feed-back error, i.e., $\rho_t(i)=\rho f(i)$ =0 for i=1, 2, ..., N in (2). For results in FIG. 2(b), $\rho_t(i)$ and $\rho_f(i)$ are calculated based on the optimized $T_t$, $P_t$, and B parameters from (1).

In regards to external interference on the ergodic rate, the focus can be on the analysis of SU-MIMO, which is a special case of MAC (there is only one transmitter). The same analysis can easily be extended to MAC and IC. In the ideal case there is perfect CSI at the transmitter and the receiver. There are K interferers. Denote $h_k$ as the channel from node k to the receiver and $\sigma_k^2$ as the corresponding interference power. Treating interference as noise, the achievable rate is given by $$C_{SU} = E_H\left[\max_{Q:tr(Q) \le \rho_{max}} \log_2\left(\det\left(I + \left(\sum_{k=1}^K \sigma_k^2 h_k h_k^* + \sigma^{2/M}\right)^{-1} HQH^*\right)\right)\right]. \quad (3)$$

where $M=\min(\eta_T, \eta_g)$. For the case with channel estimation and feedback, the achievable rate is changed to $$C_{SU} = \max_{T_t,P_t,B} \frac{T_d}{T} E_{\hat{H}}\left[\max_Q \log_2(\det(I + \Omega_{SU}))\right], \quad (4)$$

$$\Omega_{SU} = \left(\sum_{k=1}^K \sigma_k^2 h_k h_k^* + (\sigma^2 + \rho\alpha^2 tr(Q))I_M\right)^{-1} \hat{H}Q\hat{H}^*,$$

where $\hat{H}$ is the estimated channel matrix with rank $M=\min(\eta_T, \eta_g)$.

Figure 3:
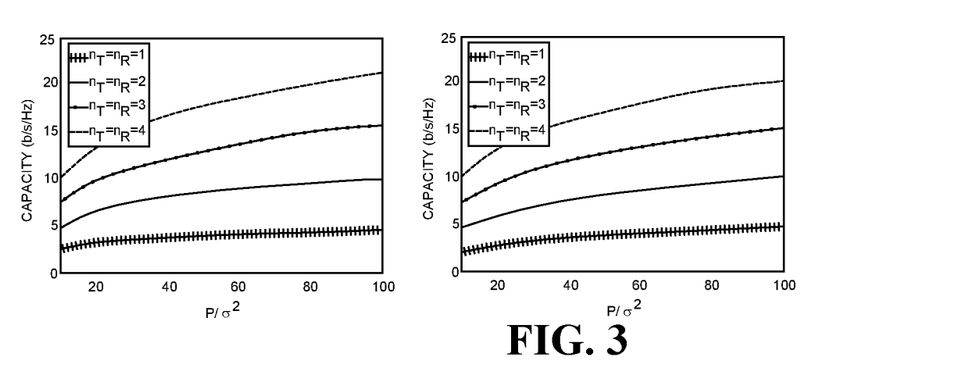
FIG. 3 depicts graphs of the ergodic of SU-MIMO with full CSI at the transmitter and with channel uncertainty when the external interference is equal to the noise power.

FIG. 3 shows the ergodic rate results (a) for the perfect CSI at the transmitter and (b) under channel uncertainty when the total interference power is the same as noise power, i.e., $$\sum_{k=1}^K \sigma_k^2 = \sigma^2.$$

A Rayleigh fading channel is assumed for both full CSI and channel uncertainty cases. The instantaneous channel values, H and $\hat{H}$, are randomly selected from the same distribution. Results in FIG. 3 (a) assume that there is no error associated with channel estimation or feedback, and (3) is used to calculate the results. For results in FIG. 3 (b), (4) is used and the error terms $\rho_t$ and $\rho_f$ are calculated based on the optimized $T_t$, $P_t$, and B parameters from (4). The ergodic rate is decreasing with the increasing interference power. On the other hand, the interference usually does not distribute evenly on all channels. The waterfilling solution can spend more power on good channels and thus the rate does not decrease significantly. In all cases, MIMO provides additional gains over single antenna systems under external interference effects. The analysis of external interference effects is discussed below, where the simultaneous activations of MU-MIMO configurations in a network generate the in-network interference (external to each given configuration) that is carefully accounted for MU-MIMO configuration selection and rate optimization.

Figure 4:
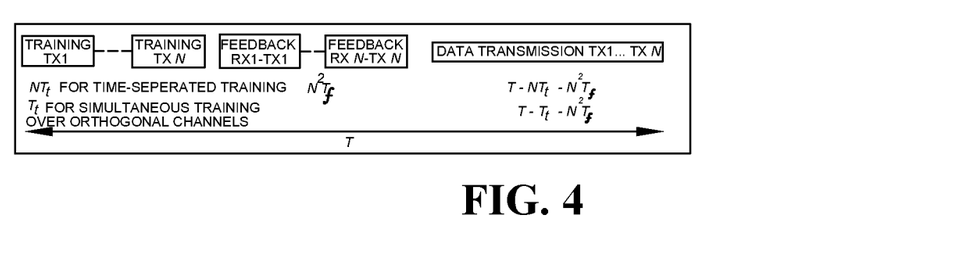
FIG. 4 depicts transmission phases in MIMO IC.
Figure 5:
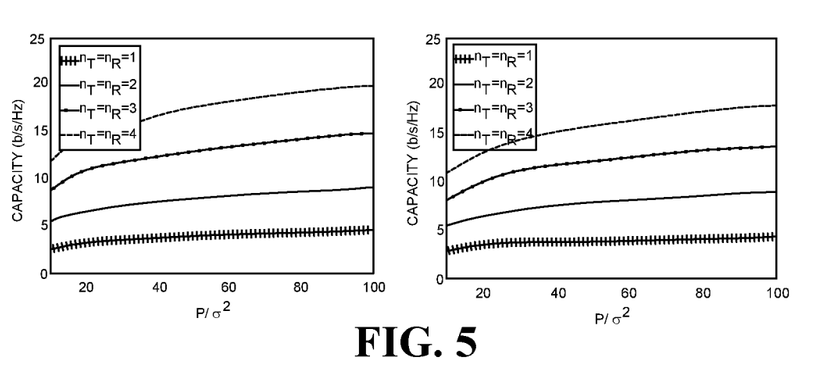
FIG. 5 depicts graphs of the sum rate of two-user MIMO IC with full CSI at the transmitter and with channel uncertainty.

In an IC configuration with N transmitter-receiver pairs, each transmitter with $\eta_T$ antennas transmits to its (single) receiver with $\eta_R$ antennas. IC can be thought of multiple SU transmissions that interfere with each other and are coordinated together. There are three phases (training, feedback and data transmission) during coherence time T, as illustrated in FIG. 4. Transmitters transmit their training sequences simultaneously such that the total training time is $T_t$. After that, each receiver sends the feedback separately to each transmitter such that the total feedback time is $N^2T_f$. The remaining time for data transmission is $T_d=T-T_t-N^2T_f$. The sum rate by N transmitter-receiver pairs (in bits/s/Hz) is optimized as $$C_{IC} = \max_{T_t, P_t, B} \frac{T_d}{T} E_{\hat{H}_{11}, \hat{H}_{12}, \ldots, \hat{H}_{NN}} \left[ \max_{Q_1, Q_2, \ldots, Q_N} \sum_{i=1}^{N} \log_2(det(I + \Omega_{IC})) \right], \quad (5)$$

$$\Omega_{IC} = \left( \left( \sigma^2 + \sum_{j=1}^{N} \rho_{ji} \alpha_{ji}^2 tr(Q_j) \right) I + \sum_{1 \le j \le N}^{j \ne i} \hat{H}_{ji} Q_j \hat{H}_{ji}^* \right)^{-1} \hat{H}_{ii} Q_i \hat{H}_{ii}^*$$

subject to $$T = T_t + N^2 T_f + T_d, \; T_f = n_T n_R B T_s, \quad (6)$$

$$\rho_{ij} = \rho_f(i, j) + \rho_t(i, j),$$

$$\rho_t(i, j) = \frac{\sigma^2}{\sigma^2 + \frac{T_t/T_s}{n_T} \alpha_{ij}^2 P_i} \cdot \rho_f(i, j) = (1 - \rho_t(i, j))2^{-B},$$

$$P_t T_t + tr(Q_i) T_d \le PT, \; P_f T_f \le PT, \; P, P_t, P_f \le P_{max},$$

where $\hat{H}_{ij}$ is the estimated channel matrix that is sent from receiver j to transmitter i with channel gain $\alpha_{ij}^2(1-\rho_{ij})$, and $\rho_{ij}$ is the joint error of channel estimation and feedback in $\hat{H}_{ij}$. The optimization in (5) is solved as the outer-inner layer problems as in the MAC case. For different values of $\eta_T$ and $\eta_R$, the ergodic sum rate of two-user MIMO IC is shown in FIG. 5 as a function of $P/\sigma^2$ under the two cases of (a) perfect CSI and (b) channel uncertainty. Channel gains are $$\alpha_{11}^2 = 1, \; \alpha_{12}^2 = 0.25, \; \alpha_{22}^2 = 0.5, \; \alpha_{21}^2 = 0.15.$$

and coherence time is T=10,000. A Rayleigh fading channel is assumed for both full CSI and channel uncertainty cases. The instantaneous channel values, $\hat{H}_{ji}$, are randomly selected from the same distribution. Results in FIG. 5 (a) assume that there is no error associated with channel estimation or feedback, i.e., $\rho_t(i, j)=\rho_f(i, j)=0$ in (6). For results in FIG. 5 (b), $\rho_t(i, j)$ and $\rho_f(i, j)$ are calculated based on the optimized $T_t$, $P_t$, and B parameters from (5).

Figure 6:
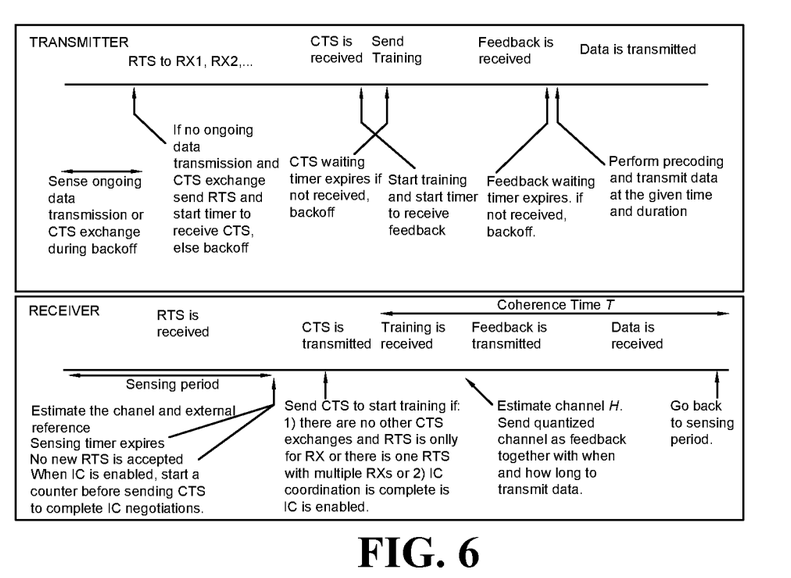
FIG. 6 depicts protocol for channel access with MU-MIMO configuration activation.

The single MU-MIMO configuration is extended to the MANET setting with simultaneous operations of multiple MU-MIMO configurations changing over time. If the network layer has made the routing decision and provided each node with the traffic to be transmitted to other node(s); i.e., the potential links to be activated are given. The decentralized protocol shown in FIG. 6 activates MU-MIMO channel configurations for channel access. This protocol operates without any centralized scheduler or common control channel. Nodes switch between sensing, transmission and reception. All nodes are potential receivers. A node with data to transmit is also a potential transmitter. The roles of the nodes are fixed during the course of the simulation. This protocol adapts some control messages used in carrier sense multiple access with collision avoidance (CSMA/CA). A rate-optimizing scheme is integrated to activate the best set of MU-MIMO configurations. The following control packets are used:

Request to send (RTS): [Type, transmitter ID, receiver IDs]. An RTS message is transmitted to initiate a data transmission. A receiver decodes every RTS message received and records the packet content. The information from the RTS messages intended for other receivers are used for the link selection of IC configurations.

Clear to send (CTS): [Type, receiver ID, {transmitter IDs}, {Training time slots}]. A CTS message is sent to activate a MU-MIMO configuration, when the MU-MIMO configuration selection is completed.

Training: [Type, transmitter ID, receiver ID, training sequence]. The channel matrices are estimated from the training sequence subject to noise and interference effects.

Feedback: [Type, receiver ID, transmitter IDs, time for transmission, channel feedback for transmitter IDs]. The quantized channel estimate is sent back to the transmitter.

Space-time block codes are used to transmit RTS and CTS messages using multiple antennas. A coarse channel estimation is then performed at the receiver based on the RTS messages. This estimate is later used during the MU-MIMO configuration selection to maximize the achievable rate.

Each node starts operating in a random time slot with the sensing state. A transmitter initially senses channel and sends the RTS message if no other ongoing data transmission or CTS message is detected. A receiver may receive multiple RTS messages during the sensing period and then it activates the MU-MIMO configuration that can achieve the maximum rate among all potential configurations. The process of selecting MU-MIMO configurations (MAC or IC) is presented below. After completing this selection, a receiver sends the CTS message to activate the selected link(s). Once transmitter node(s) receive the CTS message, the training, feedback and data transmission phases are completed within the coherence time T.

Protocol Steps at Each Transmitter:
1: Sense transmissions during the transmitter sensing time.
2: if A CTS message is heard or channel is busy then
3: Backoff, go to initial sensing stage.
4: else
5: Send RTS and start CTS timer.
6: if CTS message(s) is received then
7: Send the training sequence during the time slot specified in the CTS message.
8: if Feedback is received then
9: Send data.
10: else
11: Go to initial sensing stage.
12: else
13: Go to initial sensing stage.
Protocol Steps at Each Receiver:
1: Sense transmissions during the receiver sensing time.
2: if A CTS message is overheard during sensing or channel is busy then
3: Backoff.
4: if Received RTS message(s) during receiver sensing time then
5: Determine the rate-optimizing MU-MIMO configuration according to the mechanism described below.
6: if IC configuration is selected then
7: Coordinate with other receiver(s) that will be included in IC.
8: Send CTS message.
9: if Received training sequence(s) then
10: Estimate channels and transmit channel feedback.
11: else
12: Go to initial sensing stage.
13: if Received data transmission then
14: Process the received data. The rate is computed from the rate expression of the activated MU-MIMO configuration, where the total interference from simultaneous transmissions is treated as noise.

15: else
16: Go to initial sensing stage.

For instance, a receiver m receives the first RTS message in its sensing stage and starts its RTS timer. If it receives a CTS intended for other nodes before its RTS timer expires, it should not transmit its CTS message to activate any MAC or IC transmission. Otherwise, it needs to decide which MAC or IC configuration to activate. Denote $M_m$ as the set of receivers whose intended transmitters have transmitted RTS messages and receiver m has received these messages before m's RTS timer has expired. For each $p \in M_m$, denote $N_{m,p}$ as the set of transmitters from which receiver m has received RTS messages intended to receiver p before m's RTS timer has expired. If m decides to activate a MAC configuration, it needs to select a set of transmitters from $N_m$. If m decides to activate an IC configuration, it needs to select one transmitter from $N_m$. In addition, it selects some receivers from $M_m$ and a transmitter from $N_{m,p}$ for each selected receiver p. An IC configuration is enabled only when (i) all its transmitters are located within the transmission range of the receiver that is selected for coordination and (ii) all its receivers are located within the transmission range of each other.

The objective of receiver m is to select the MU-MIMO configuration with the maximum achievable sum rate. Denote $C_{MAC}(m, N)$ as the total MAC rate (given in (1)) from transmitters in a non-empty set $N \subseteq N_m$ to receiver m. Denote $C_{IC}(M, N)$ as the total IC rate (given in (5)) from transmitter set N to receiver set M, where $N_i$ intends to transmit to receiver $M_i$ and $m \in M$. Without loss of generality, we assume m as the first element of M, i.e., $m = M_1$. To avoid ambiguity caused by SU communications from a transmitter p to receiver m (which can be regarded as both a special case of MAC and IC), we require that $|M| > 1$. We define the set of decision variables d coordinated by receiver m as follows:

$d_{p,q} = 1$ if transmitter q is activated to transmit to receiver p, else $d_{p,q} = 0$.

$d_{m,N} = 1$ if MAC transmitters in set N are activated to transmit to receiver m (other transmitters in $N_m - N$ or $N_{m,p}$ for $p \neq m$ are not activated), else $d_{m,N} = 0$.

$d_{M,N} = 1$ if each transmitter $N_i$ is activated to transmit to receiver $M_i$ and $m = M_1$ (other transmitters in $N_m + \Sigma_{p \in Mm} N_{m,p} - N$ are not activated), else $d_{M,N} = 0$.

Based on the above definitions, we have $$d_{m,N} = \prod_{q \in N} d_{m,q} \times \prod_{q \notin N} (1 - d_{m,q}) \times \prod_{p \in M_m} \prod_{q \in N_{m,p}} (1 - d_{p,q}), \quad (7)$$

$$d_{M,N} = d_{m,N_1} \times \prod_{q \in N}^{q \notin N} (1 - d_{m,q}) \times \prod_{p \in M}^{p \neq m} \prod_{q \in N_{m,p}} (1 - d_{p,q}). \quad (8)$$

There is only one variable among all $d_{m,N}$ ($N \subseteq N_m$ and $|N| > 0$) and $d_{M,N}$ ($M \subseteq \{m\} \cup M_m$, $M_1 = m$, $|M| > 1$, $N_i \in N_{Mi}$) with value equal to 1. The total rate $C_m(d)$ of the MU-MIMO configuration activated by receiver m is given by $$C_m(d) = \sum_{N \subseteq N_m}^{|N|>0} d_{m,N} C_{MAC}(m, N) + \sum_{M \subseteq \{m\} \cup M_m}^{M_1=m,|M|>1} \sum_{N:N_i \in N_{Mi}} d_{M,N} C_{IC}(M, N). \quad (9)$$

This optimization problem is solved as a mixed-integer linear programming (MILP) by noting that a product of binary variables $X = x_1 x_2 \ldots x_n$ can be replaced by $X \geq x_i$ for each i and $X \geq 1 - n + \Sigma_i x_i$. Since this problem is decomposed to a limited area around each receiver m, the problem size is not large and thus this MILP is efficiently solved (e.g., optimization software tools such as CPLEX can be used).

A discrete time simulator is written in MATLAB to simulate the MU-MIMO protocol by providing channel, interference and traffic effects in the network. Nodes are initially assigned positions to meet the initial percentage of SU and MAC configurations (namely the percentage of receivers with single or multiple transmitters within the communication range) and then start moving according to Brownian motion. The channel gain $\alpha_2$ at any time is determined from node locations according to the two-ray ground-reflection model. In addition, multipath fading is added to the channel. Nodes are assigned fixed transmitter and receiver roles at the beginning of simulation. Nodes form different MU-MIMO configurations that may change during the simulation according to channel, traffic, and interference dynamics. Table 1 shows the configurable (protocol and radio/network) parameters and their default values. Each time MU-MIMO configuration selection and RTS/CTS message exchange are completed around any receiver, the training, feedback and data transmission phases of this local MU-MIMO configuration are treated as a block resulting in MU-MIMO rates, (1) for MAC or (5) for IC.

Since multiple MU-MIMO configurations are concurrently activated, they cause interference to each other. Each node computes this in-network (uncoordinated) interference (in addition to IC interference) during sensing and reflects it in the rate computation. Consider K interferers, where $h_k$ is the channel from the kth interferer to the receiver and $\sigma_k^2$ is the interference power. Treating interference as noise, the effective noise in the rate expression (1) or (5) changes to $$\sum_{k=1}^{K} \sigma_k^2 h_k h_k^* + \sigma^2 I.$$

For the special case of one SU-MIMO, the achievable rate is given by (4).

Figure 7:
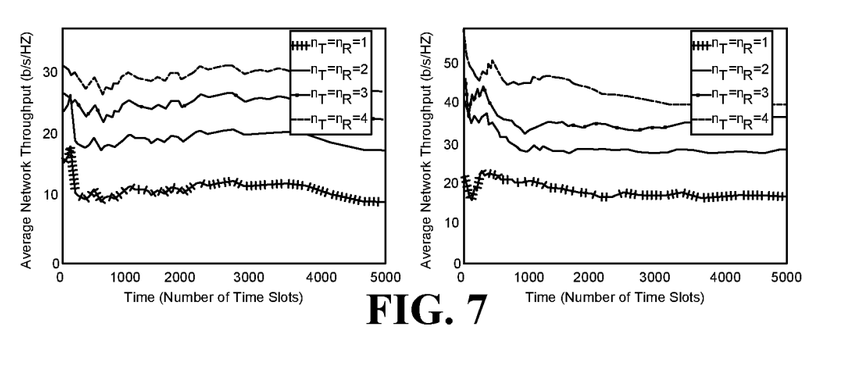
FIG. 7 depicts graphs of average network throughout for 100% SU and for 60% SU and 40% MAC with IC enabled.

First, an example with 100% SU traffic (a special case of MAC without enabling IC) is considered. Network throughput (sum rate over all transmitters and receivers) is measured over time. FIG. 7(a) shows the average network throughput over time for different values of $\eta_T$ and $\eta_R$. The throughput increases gradually over time, since each node starts to operate at a different time, and stabilizes over the course of simulation. After accounting for the control message overhead, the network throughput increases with $\eta_T$ and $\eta_R$. At the end of 5000 slots, 125, 219, 287 and 336 Mbits are delivered when $\eta_T = \eta_R = 1$, 2, 3 and 4, respectively. Next, a mixed traffic of 60% SU and 40% MAC is considered. IC operation is enabled for SU links. For this case, we also consider a heterogeneous network (HetNET) scenario where each node pair has different number of antennas between one and four which is randomly selected from a uniform distribution. FIG. 7(b) shows the average network throughput over time. Over 5000 slots, 203 Mbits, 347 Mbits, 452 Mbits and 492 Mbits are delivered when $\eta_T = \eta_R = 1$, 2, 3 and 4, respectively, and 370 Mbits are delivered for HetNet. The simulation results clearly show the increase in the average network throughput with the activation of MU-MIMO configurations in the MANET.

TABLE 1

Network simulation parameters.

| Protocol | Value | Radio/Network | Value |
|---|---|---|---|
| One slot (400 bits) | 2.5 ms | Frequency | 3 GHz |
| TX sensing time | 3 time slots | Bandwidth | 1.28 MHz |
| RX sensing time | 10 time slots | TX power | 1 W |
| T (coherence time) | 25 time slots | Comm. range | 1.41 km |
| RTS or CTS length | 1 time slot | Area size | 10 km × 10 km |
| RTS or CTS timer | 10 time slots | RX sensitivity | −126 dBW |
| Training time | 3 time slots | No. of nodes | 50 |
| Feedback | $8\pi_T\pi_R$ bits | RTS threshold | 10 dB SINR |
| Backoff timer | 3 time slots | Speed | 2 m/s |

Consider multiple nodes that need to communicate in a MANET over multiple hops without transmitter and receiver pairs being determined a priori. A cross-layer protocol is presented where decentralized backpressure algorithm is used for MU-MIMO link activation and routing. Each source node generates a random traffic destined to a randomly selected destination. Each node may act as a transmitter or a receiver or stay idle at any given time. At any time, a node with packets available to transmit starts to sense the spectrum and broadcasts an RTS message at the end of sensing if the received power level is below a threshold and it has not received an RTS or a CTS message (intended for some other node) during its sensing time. If the node receives an RTS message during sensing, it has a potential receiver role. If it receives a CTS message, it backs off and continues sensing for the next opportunity.

Figure 8:
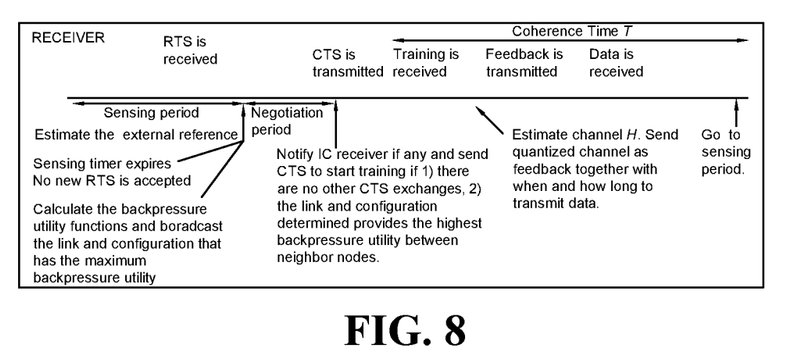
FIG. 8 s depicts protocol for MU-MIMO configuration activation and routing at the receiver using decentralized backpressure algorithm.

After sensing, the node that sends an RTS message has a potential transmitter role. An RTS packet includes a pilot signal for channel estimation and queue information of the transmitter for each flow. A potential receiver may receive multiple RTS messages during the sensing period. The receiver performs channel estimation using the pilot signal in each RTS packet and calculates the expected rate if the link is activated. It also calculates the maxi-mum backlog by using the difference between its own queue and the potential transmitter's queue for each flow. The backpressure utility for each potential receiver and transmitter(s) is calculated according to (10). The negotiation period starts after sensing during which the backpressure utility information is broadcast to neighbor nodes. The receiver node that has the highest utility is selected to be activated. IC configuration is evaluated if the selected configuration is SU-MIMO and there is any other SU-MIMO pair with lower utility that will not cause harmful interference to the communication of the selected SU-MIMO pair. Then the selected receiver(s) sends a CTS message to its transmitter(s) and training, feedback and data transmission steps are executed. FIG. 8 illustrates the cross-layer link activation and routing protocol for the receiver. The transmitter side of the block diagram is the same as in FIG. 6. The algorithms that the receivers and transmitters use are provided below. Each node first follows the protocol steps below to determine its role (transmitter or receiver):

Protocol step to determine the roles of transmitter and receiver:
1: Sense the channel.
2: if Channel is empty, no other RTS or CTS (intended for any other radio) is heard, and packets are available to transmit then
3: Assume a potential transmitter role, broadcast an RTS mes-sage, and start the CTS timer.
4: else
5: if Channel is not empty or a CTS message is heard then
6: Backoff and go to Step 1.
7: else
8: if An RTS message is heard then
9: Assume a potential receiver role, start the receiver sensing time, and continue sensing.

Based on its role, a node will run one of the following two protocols (either the protocol for a transmitter or the protocol for a receiver).

Protocol step at each transmitter:
1: Wait for the CTS message.
2: if CTS message(s) is received then
3: Send the training sequence during the time slot specified in the CTS message.
4: if Feedback is received then
5: Send data.
6: else
7: Go to protocol step to determine the roles of transmitter and receiver.
8: else
9: Go to protocol step to determine the roles of transmitter and receiver.

Protocol step at each receiver:
1: Sense transmissions during the receiver sensing time.
2: if A CTS message is overheard during sensing then
3: Backoff.
4: Go to protocol step to determine the roles of transmitter and receiver.
5: if RTS message(s) is received during receiver sensing time then
6: Perform channel estimation.
7: Calculate and broadcast the backpressure utility.
8: Start the negotiation timer.
9: if A status message is heard from another receiver with a higher utility then
10: if If is for SU-MIMO then
11: Wait for the potential IC configuration.
12: if No IC message is received during negotiation time then
13: Go to protocol step to determine the roles of transmitter and receiver
14: else
15: Go to protocol step to determine the roles of transmitter and receiver.
16: else
17: Send CTS message.
18: if Training sequence(s) is received then
19: Estimate channels and transmit channel feedback.
20: else
21: Go to protocol step to determine the roles of transmitter and receiver.
22: if Data transmission is received then
23: Compute the rate.
24: else
25: Go to protocol step to determine the roles of transmitter and receiver.

In addition to maximizing the achievable rates, it is important to stabilize queues in a wireless network. The stable through put region has been considered for different network communication models such as broadcast channels and has been studied in terms of its trade-offs with other performance measures. The backpressure algorithm is optimal in terms of maximizing the stable throughput, i.e., it can stabilize the system for any arrival rates in the stability region. In this paper, we apply the backpressure algorithm for joint routing and scheduling over MU-MIMO communications.

To describe the queue evolution, the following terms are defined. $U_i^{(c)}(t)$ is the length of queue of node i for flow c at time t. $A_i(t)$ is the arrival rate for node i at time t.

$$\mu_{ij}^{(c)}\left([\tau]_{\tau=t}^{t+g(U(t))-1}\right)$$

is the rate of packet arrivals from node i to node j for flow c over time interval [t, t+g(U(t))−1], where g (U(t)) is used to define the state-dependent step-size, since each MU-MIMO configuration takes a different time to complete because of the difference in their underlying channel estimation, feedback and data transmission phases. Depending on the MIMO configuration selected, the queue is updated over this variable step-size g(U(t)). Note that the rate $$\mu_{ij}^{(c)}\left([\tau]_{\tau=t}^{t+g(U(t))-1}\right)$$

is 0 if node I is not activated as a transmitter, or $C_{SU}$ if link (i, j) is activated in a SU channel configuration (note that $C_{MAC}$ and $C_{IC}$ are reduced to $C_{SU}$ for one transmitter), $C_{MAC}$ if link (i, j) is activated in a MAC configuration, or $C_{IC}$ if link (i, j) is activated in an IC configuration. The potential increase in queue from $U_i^{(c)}(t)$ to $U_i^{(c)}(t+g(U(t)))$ over g (U(t)) slots is $$\sum_{\tau=t}^{t+g(U(t))-1} A_i(\tau)$$

due to the self-generated packets and $$\sum_{\tau=t}^{t+g(U(t))-1} \sum_a \mu_{ai}^{(c)}(\tau)$$

due to the departing packets.

The centralized version of the backpressure algorithm maximizes the sum of differential backlogs weighted by link rates:

$$\sum_{abc} (U_a^{(c)}(t) - U_b^{(c)}(t)) \mu_{ab}^{(c)}([\tau]_{\tau=t}^{t+g(U(t))-1}). \tag{10}$$

After deriving the centralized optimality of this algorithm, we will also present a decentralized version of it. To derive the stabilizing control algorithm, a Lyapunov function is defined over the joint queue-states and the expected one-step drift of this Lyapunov function is shown to be negative. However, this argument cannot be readily applied for MU-MIMO communications, since whenever a node is activated in a particular MU-MIMO configuration, there cannot be another control decision for some A time slots that take different values depending on the type of MU-MIMO configuration (SU, MAC or IC) and the number of nodes activated, if the MAC configuration is selected. Hence, the queue backlog and the one-step Lyapunov drift are not well-defined at times t+1, ..., t+λ−1. Instead, the drift is evaluated using state-dependent step-sizes. Note that this notion is slightly different from the multi-step drift defined in since the state-dependent drift assumes that the step size changes with the control action (namely, which MU-MIMO configuration to choose) that also de-pends on the queue state (e.g., a MAC configuration with N transmitters can be activated only if queues of N nodes have packets in their queues), whereas the multi-step drift assumes the same step size. The notion of state-dependent step-sizes has been applied in wireless networks to stabilize the network coded packet traffic, where drift with state-dependent step-sizes is needed depending on the length of network coding blocks. As presented state-dependent step-sizes are needed to accommodate for different queue occupancies to start different MU-MIMO configurations as well as variable lengths of MU-MIMO communication frames that include RTS/CTS packet lengths and timers, time for negotiations, channel estimation, feedback, and actual data transmission.

The quadratic Lyapunov function is defined as:

$$L(U(t)) = \sum_i (U_i^{(c)}(t))^2 \tag{11}$$

for the set of queue backlogs U(t) in time slot t. Let g(U(t)) be the state-dependent step-size, such that g(U(t)) includes the time for RTS and CTS of transmitter and receiver, channel estimation, feed-back and data transmission. The term g(U(t)) is upper bounded by $T_{total}$.

$T_{total}$ is derived according to the protocol steps:

A transmitter starts with a sensing period $T_{TX}$ to find whether the channel is busy (with data transmission or CTS). If not, then it transmits RTS with length of $T_{RTS}$ slots and waits for CTS up to $T_{CTS}$ slots, which includes the time to wait for a negotiation signal, the time for negotiation, and the time to receive CTS message. If CTS is received, then it starts a data block with $T_{data}$ slots. The entire process is up to $T_{TX}+T_{RTS}+T_{CT\,Stimer}+T_{data}$ slots.

A receiver starts with a sensing period of $T_{RX}$ slots to find whether there is any RTS. If yes, then it negotiates with transmitter for up to $T_{negotiation}$ slots and transmits CTS with length of $T_{CTS}$ slots to the selected transmitter. It receives data block with length of $T_{data}$ slots. The whole process is up to $T_{RX}+T_{negotiation}+T_{CTS}+T_{data}$ slots.

Although instances of transmitter and receiver update time may be different, the maximum values should be the same for efficiency such that neither transmitter nor receiver lag each other with idle waiting, i.e., $$T_{total} = T_{TX} + T_{RTS} + T_{CTStimer} + T_{data} \tag{12}$$
$$= T_{RX} + T_{negotiation} + T_{CTS} + T_{data}.$$

Next, the stability control algorithm for MU-MIMO communications are derived. The correspondence system of queues is stable under the backpressure policy provided that $$\Delta(U(t)) = E[L(U(t+g(U(t)))) - L(U(t))|U(t)] \tag{13}$$

is negative for sufficiently large backlogs.

The backlog in each queue of node i for flow c over the g (U(t)) time slots into the future can be bounded in terms of the current backlogs as $$U_i^{(c)}(t + g(U(t))) \leq \tag{14}$$

-continued $$\left[U_i^{(c)}(t) - \sum_{\tau=t}^{t+g(U(t))-1} \sum_b \mu_{ib}^{(c)}(\tau)\right]^+ + \sum_{\tau=t}^{t+g(U(t))-1} A_i(\tau) + \sum_{\tau=t}^{t+g(U(t))-1} \sum_a \mu_{ai}^{(c)}(\tau),$$

where $\mu_{jk}^{(c)}(T)$ is the service rate from node j to node k for flow c at time $\tau$, $A_i(\tau)$ is arrival rates for node i at time $\tau$, and $[x]+=\max(x, 0)$. The condition (14) is an upper bound because new arrivals may depart before the interval of $g(U(t))$ time slots is finished and $\mu_i(T)$ contributes to (14) only if $U_i(t)>0$. Thus, $$\left(U_i^{(c)}(t+g(U(t)))\right)^2 \leq \left(U_i^{(c)}(t)\right)^2 + \left[U_i(t)^{(c)} - \sum_{\tau=t}^{t+g(U(t))-1} \mu_i(\tau)\right]^+ + \sum_{\tau=t}^{t+g(U(t))-1} A_i(\tau). \quad (15)$$

Note that for any non-negative real numbers V, U, $\mu$ and A, $$V^2 \leq U^2 + \mu^2 + A^2 - 2U(\mu - A), \text{ if } V \leq [U-\mu]^+ + A \quad (16)$$

from. Then, from (15), $\Delta(U(t))$ is upper bounded as $$\Delta(U(t)) \leq T_{total}^2 \left(2 + \sum_i (A_i^{max})^2\right) - \quad (17)$$

$$2\mathbb{E}\left[\sum_{ic} U_i^{(c)}(t)\left[\sum_b \mu_{ib}^{(c)}([\tau]_{\tau=t}^{t+g(U(t))-1}) - \sum_a \mu_{ai}^{(c)}([\tau]_{\tau=t}^{t+g(U(t))-1})\right]\bigg| U(t)\right],$$

since $g(U(t)) \leq T_{total}$, where $A_i^{max}$ is the maximum number of packets that can be generated by node i at any time.

To minimize the left-hand side of (17), backpressure algorithm selects at any time t the MU-MIMO configuration along with the activated transmitters to maximize $$\sum_{ic} U_i^{(c)}(t)\left[\sum_b \mu_{ib}^{(c)}([\tau]_{\tau=t}^{t+g(U(t))-1}) - \sum_a \mu_{ai}^{(c)}([\tau]_{\tau=t}^{t+g(U(t))-1})\right], \quad (18)$$

or equivalently maximize (10). These formulations correspond to centralized scheduling and require knowledge of queue lengths and rates for all nodes, since the terms in (10) and (18) are summed over all nodes. Instead, we consider a decentralized implementation as discussed in the previous section. Only one MU-MIMO configuration is activated at a time in the same local neighborhood, where a receiver (selected though distributed negotiations) coordinates the selection of the link(s) that sum up to the largest backpressure utility given by $$\sum_{bc} \left(U_a^{(c)}(t) - U_b^{(c)}(t)\right)\mu_{ab}^{(c)}([\tau]_{\tau=t}^{t+g(U(t))-1}) \quad (19)$$

for transmissions from any node a in the SU and MAC configurations, and $$\sum_c \left(U_{a_1}^{(c)}(t) - U_{b_1}^{(c)}(t)\right)\mu_{a_1 b_1}^{(c)}([\tau]_{\tau=t}^{t+g(U(t))-1}) + \quad (20)$$

$$\left(U_{a_2}^{(c)}(t) - U_{b_2}^{(c)}(t)\right)\mu_{a_2 b_2}^{(c)}([\tau]_{\tau=t}^{t+g(U(t))-1})$$

for transmissions from any nodes $a_1$ and $a_2$ to nodes $b_1$ and $b_2$, respectively, in the IC configuration that is limited to two transmitter—receiver pairs in this paper.

The proposed cross-layer design is implemented with a discrete-time simulator written in MATLAB where channel, interference and traffic effects are taken into account. As discussed below, the simulation scenario was pre-generated and nodes were assigned fixed transmitter and receiver roles at the start of the simulation. In the joint scheduling and routing simulation, any node can be a potential transmitter or receiver. The roles are assigned dynamically based on RTS and CTS message exchanges and negotiations. The protocol and radio/network parameters and their default values that are provided in Table 1 are also used in this simulation. There are 20 flows in the network. The in-network interference is included in the rate calculations.

Evaluation of the performance of two different routing schemes:

Minimum distance routing with frequency of encounters: Frequency of encounters is used to define the distances to the destinations. Frequency of encounters is defined as the percentage of time nodes u and v are within their communication range $r_c$; i.e., $$m_{uv}(t) = \frac{1}{t}\sum_{\tau=1}^{t} 1(d_{uv}(\tau) \leq r_C).$$

where 1(e) is the indicator function, equal to 1 if event e happens, and 0 otherwise. The packets are forwarded to the neighbor node which has the largest frequency of encounter (i.e., the shortest distance to) the destination node.

Decentralized backpressure algorithm: The receiver node with the highest backpressure utility activates the link(s). Either SU-MIMO or MU-MIMO configuration is activated via this approach depending on the number of transmitters that want to transmit to the selected receiver. IC configuration may be activated for SU-MIMO links if there is no harmful interference between simultaneous transmissions.

Figure 9:
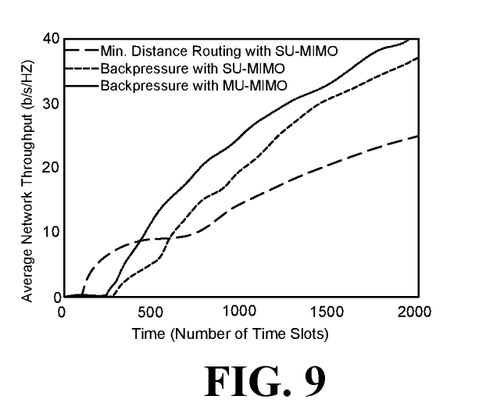
FIG. 9 depicts a graph of network throughput (measure as a moving average) with backpressure and minimum distance routing.

The performance of MU-MIMO with SU-MIMO communications when backpressure algorithm is used was compared as the routing scheme. FIG. 9 shows the simulation results with 4 antennas both at the transmitter and receivers. The network throughput measured as the moving average is higher with MU-MIMO compared to the case when the minimum distance routing is applied with SU-MIMO.

Next, the stable throughput of the backpressure algorithm with MU-MIMO was evaluated and compared the results with the case of SU-MIMO and minimum distance routing. Table 2 shows the maximum achievable throughput for each scheme when the network is saturated. The simulation is run for 50,000 time slots and 4 antennas are used at each transmitter and receiver.

Finally, the increase in the network throughput is evaluated as the number of antennas increases. Table 3 shows the results. The throughput gradually increases with increasing number of antennas, e.g., the throughput is increased to 62%, 90%, and 120%, when the number of antennas is increased from 1 to 2, 3, and 4, respectively.

TABLE 2

Maximum achievable throughput per flow after 50,000 time slots for 4 antennas (BP refers to backpressure routing).

| Scheme | Max. throughput (b/s/Hz) |
| --- | --- |
| MU-MIMO and BP | 360 |
| SU-MIMO and BP | 257 |
| SU-MIMO and Min. distance routing | 211 |

TABLE 3

Maximum achievable throughput for backpressure algorithm with MU-MIMO after 50,000 time slots.

| # antennas | Max. throughput (b/s/Hz) |
| --- | --- |
| 1 | 164 |
| 2 | 265 |
| 3 | 311 |
| 4 | 360. |

The rate optimization benefits of MU-MIMO communications in a wireless network was identified with dynamic and unknown channel conditions, and realized these benefits with a rate-optimizing protocol for channel access and MU-MIMO configuration activation. The ergodic rate analysis was used to establish the sum rates for MU-MIMO (MAC and IC) configurations under dynamic channel effects by jointly considering training and feedback in rate optimization. A decentralized protocol for channel access was designed that selects the best set of MU-MIMO (MAC or IC) configurations to maximize the achievable sum rate. Link scheduling was used for single-hop communications and then the setting was extended to joint link scheduling and routing for multi-hop MU-MIMO communications. MANET simulations verified the major increase in the average network throughput by MU-MIMO compared with single antenna and SU-MIMO systems. A decentralized version of backpressure algorithm for routing was considered. The throughput-optimal backpressure algorithm was derived to stabilizes queues via Lyapunov stability analysis. The performance of the proposed approach to minimum distance routing was compared to SU-MIMO, and verified the performance improvement.

While the invention has been taught with specific reference to these embodiments, one skilled in the art will recognize that changes can be made in form and detail without departing from the spirit and scope of the invention. This application is intended to cover any variations, uses, or adaptations of the invention using its general principles. Further, this application is intended to cover such departures from the present disclosure as has come within the known or customary practice in the art to which the invention pertains and which fall within the limits of the appended claims or equivalents thereof.

The invention claimed is:

1. A method for scheduling and routing communications among a plurality of channels in a wireless network comprising steps of:
receiving, from at least one multiple input multiple output multiple access channel of the wireless network and at least one interference channel of the wireless network, overhead effects and error caused by at least one of channel estimation, quantization and in-network interference;
analyzing ergodic sum rates of multiple input multiple output multiple access channel and interference channel configurations based on the overhead effects and the error caused by at least one of channel estimation, quantization and in-network interference, and based on the multiple access channel being treated in the analyzing of the ergodic sum rates as remaining static during a coherence time T that is divided into three phases including training, feedback and data transmission;
selecting a first multiple input multiple output multiple access channel and interference channel configuration from amongst the analyzed configurations associated with a maximum of the analyzed ergodic sum rates; and
extending a scheduling algorithm to routing according to at least the first multiple input multiple output multiple access channel and interference channel configuration via a cross-layer solution based on a decentralized version of a backpressure algorithm.

2. The method for scheduling and routing communications among a plurality of channels in a wireless network as set forth in claim 1, including the step of presenting a distributed channel access protocol to select and activate multiuser multiple input multiple output configurations with maximum achievable sum rates using local information on channel, interference, and traffic conditions.

3. The method for scheduling and routing communications among a plurality of channels in a wireless network as set forth in claim 1 including at least one transmitter, each transmitter including an antenna and each of said at least one transmitters transmitting to one receiver.

4. The method for scheduling and routing communications among a plurality of channels in a wireless network as set forth in claim 3, wherein in the training phase each transmitter transmits a training sequence separately to the receiver with power $P_t$ over time $T_t$.

5. The method for scheduling and routing communications among a plurality of channels in a wireless network as set forth in claim 3, wherein in the training phase transmitters transmit their training sequences simultaneously using orthogonal channels.

6. The method for scheduling and routing communications among a plurality of channels in a wireless network as set forth in claim 5, wherein the transmitters transmit their training sequences in time $T_t$.

7. The method for scheduling and routing communications among a plurality of channels in a wireless network as set forth in claim 3, wherein in the feedback phase, the receiver estimates channels and sends feedback separately to each transmitter with power $P_f$.

8. The method for scheduling and routing communications among a plurality of channels in a wireless network for as set forth in claim 3, wherein in the data transmission phase, each transmitter precodes and allocates power based on channel estimates received from the receiver and transmits with power $tr(Q)=P_d$ over remaining time $T_d=T-T_t-NT_f$.

9. The method for scheduling and routing communications among a plurality of channels in a wireless network as set forth in claim 1, including the step of simultaneously activating multiuser multiple input multiple output configurations in a network.

10. The method for scheduling and routing communications among a plurality of channels in a wireless network as set forth in claim 1, wherein the analyzing the ergodic sum rates is further performed based on a Rayleigh fading channel for both full channel state information and channel uncertainty cases.

11. The method for scheduling and routing communications among a plurality of channels in a wireless network as set forth in claim 1, performed without any centralized scheduler or common control channel.

12. The method for scheduling and routing communications among a plurality of channels in a wireless network as set forth in claim 1, wherein nodes switch between sensing, transmission and reception.

13. The method for scheduling and routing communications among a plurality of channels in a wireless network as set forth in claim 12, including the step of concurrently activating multiple multiuser multiple input multiple output configurations to cause interference to each other.

14. The method for scheduling and routing communications among a plurality of channels in a wireless network as set forth in claim 13, including the steps of each node computing in-network uncoordinated interference during sensing and reflecting the uncoordinated interference in a rate computation.

15. The method for scheduling and routing communications among a plurality of channels in a wireless network as set forth in claim 14, including the steps of: calculating backpressure utility for each potential receiver and transmitter, broadcasting backpressure utility information to neighbor nodes during a negotiation period starting after sensing, and selecting a receiver node with a highest utility be activated.

16. The method for scheduling and routing communications among a plurality of channels in a wireless network as set forth in claim 15, wherein the selected receiver node sends a clear-to-send message to transmitters.

17. The method for scheduling and routing communications among a plurality of channels in a wireless network as set forth in claim 16, wherein frequency of encounters is used to define distances to destinations.

18. The method for scheduling and routing communications among a plurality of channels in a wireless network as set forth in claim 1, including the step of adapting the first multiple input multiple output multiple access channel and interference channel configuration to dynamic channel, interference, and traffic conditions.

19. The method for scheduling and routing communications among a plurality of channels in a wireless network as set forth in claim 1, wherein the method is performed in a mobile ad hoc setting.

20. The method for scheduling and routing communications among a plurality of channels in a wireless network as set forth in claim 19, including the step of improving stable throughput over a minimum routing distance based on frequency of encounters and single user multiple input multiple output communications.

\* \* \* \* \*